United States Patent
Barman et al.

(12)

(10) Patent No.: US 6,392,688 B1
(45) Date of Patent: May 21, 2002

(54) HIGH ACCURACY STEREO VISION CAMERA SYSTEM

(75) Inventors: Rod Barman; Vladimir Tucakov, both of Vancouver (CA)

(73) Assignee: Point Grey Research Inc., Vancouver (CA)

( * ) Notice: Subject to any disclaimer, the term of this patent is extended or adjusted under 35 U.S.C. 154(b) by 0 days.

(21) Appl. No.: 09/411,230

(22) Filed: Oct. 4, 1999

(51) Int. Cl.⁷ .......................... H04N 13/00; H04N 15/00
(52) U.S. Cl. .............................. 348/42; 348/48; 348/125
(58) Field of Search .............................. 348/42, 47, 48, 348/340, 373, 374, 375, 335; H04N 13/00, 15/00

(56) References Cited

U.S. PATENT DOCUMENTS

| | | | | |
|---|---|---|---|---|
| 4,636,627 A | * | 1/1987 | Matsumura | 250/201.8 |
| 5,091,793 A | * | 2/1992 | Goto et al. | 359/831 |
| 5,130,804 A | * | 7/1992 | Tamura et al. | 348/231 |
| 5,444,485 A | * | 8/1995 | Uchioke et al. | 348/355 |
| 5,517,364 A | * | 5/1996 | Suzuki | 359/823 |
| 5,825,560 A | * | 10/1998 | Ogura et al. | 359/822 |

* cited by examiner

*Primary Examiner*—Nhon T Diep
(74) *Attorney, Agent, or Firm*—Oyen Wiggs Green & Mutala

(57) ABSTRACT

A stereo camera system suitable for use in high performance computer vision systems has two or more electronic cameras. Each camera has an assembly comprising a light sensing array and a lens assembly which are each directly mounted to a rigid mounting member. The rigid mounting member may be, for example, a thick metal plate penetrated by a plurality of apertures which provide light paths between the lens assemblies and the light sensing arrays. Stereo camera systems according to the invention are more rugged than current stereo camera systems. Calibration is maintained for longer periods of time. Relative motion between the two or more cameras is virtually eliminated. Relative motion between the optical components of individual cameras is virtually eliminated.

12 Claims, 3 Drawing Sheets

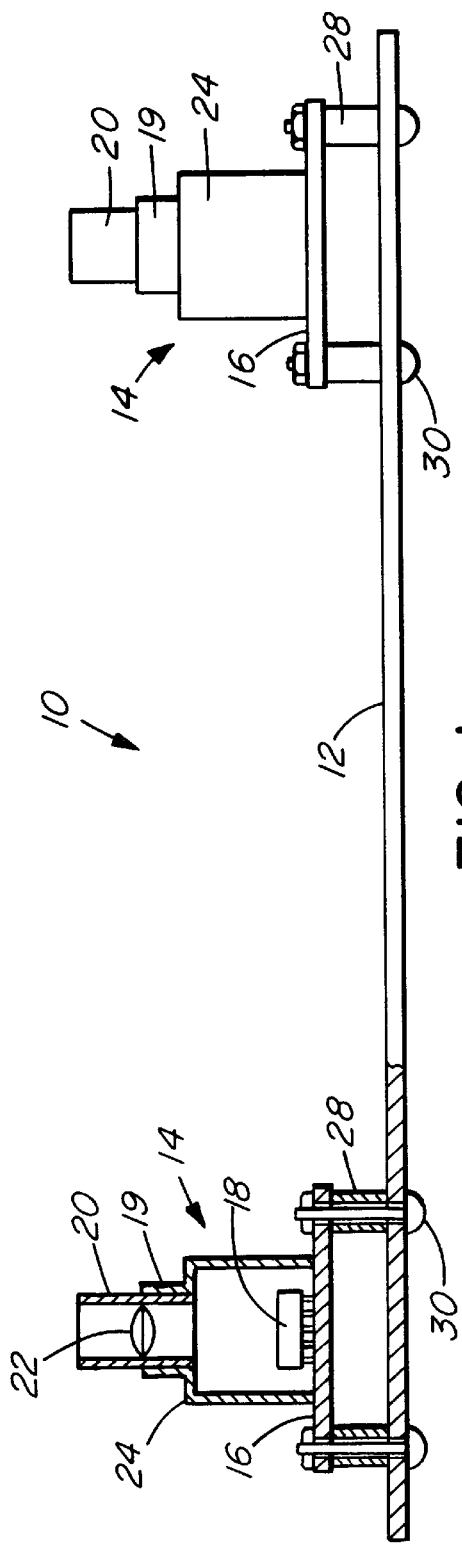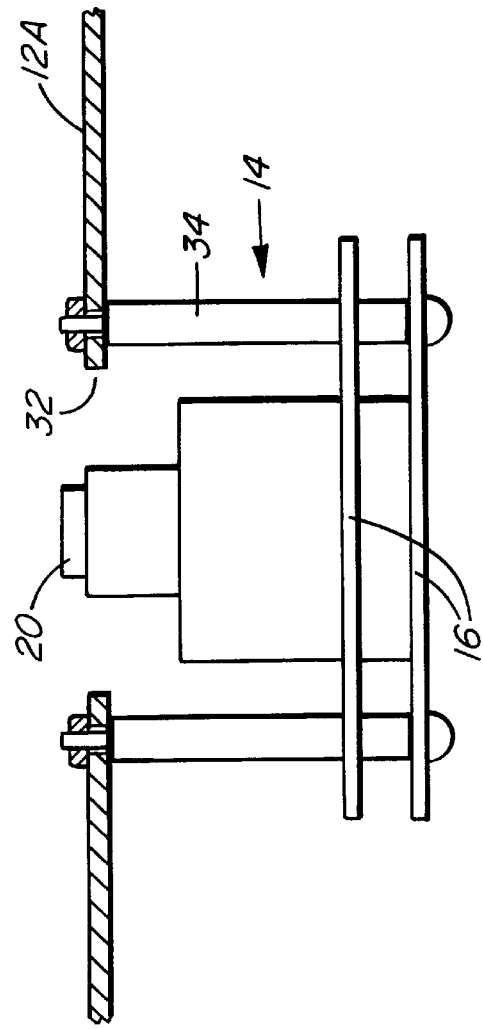
FIG. 1 PRIOR ART
FIG. 2 PRIOR ART

HIGH ACCURACY STEREO VISION CAMERA SYSTEM

TECHNICAL FIELD

This invention relates to stereo camera systems in which images obtained by two or more spaced apart cameras are used to obtain three-dimensional information about objects in the fields of view of the cameras. The invention has particular application to stereo camera systems for use in high accuracy computer vision applications.

BACKGROUND

Stereo camera systems are used to acquire three-dimensional information about objects. Stereo camera systems are used, for example, in computer vision systems, 3-dimensional tracking applications, object dimensioning applications, object tracking applications, and so on. Typical stereo camera systems include at least two, and typically three or more, electronic cameras which are mounted at spaced apart locations. The electronic cameras have overlapping fields of view. A computer connected to receive images from each of the cameras can compare the images to derive three-dimensional information about objects in the field of view. Information such as the distances to the objects and the sizes, dimensions and orientations of the objects can be determined by triangulation.

A stereo camera system is typically calibrated by placing a known object in the field of view of the cameras. Computer software which receives images from the cameras can determine the precise relationship between the cameras from the images of the known object and also compensate for distortions introduced by the lenses. After the stereo camera system has been calibrated then the computer can be used to obtain information about objects whose positions or configurations are not known.

Currently available stereo camera systems use small cameras which have arrays of light sensing elements such as charge coupled devices ("CCDs"), CMOS sensors or the like. A typical camera, as is used in a typical stereo camera system, comprises a circuit board on which a light sensing array is mounted. A lens is supported above the light sensing array by a lens holder. The entire camera is mounted by the circuit board to a suitable support in a desired position relative to other cameras in the stereo camera system.

A problem with such existing stereo camera systems is that the calibration of the systems can degrade over time. For a stereo camera system to remain perfectly calibrated the fields of view of the cameras must not move relative to one another. In a conventional stereo camera system there is potential for movement in the mounting between the lens holders and the circuit boards, in the mounting between the circuit boards and the substrate or frame to which the circuit boards are attached and there is potential for movement of the frame itself. The multiple interfaces between components in a conventional stereo camera system make it highly likely that vibration, shocks or the like will cause the field of view of one or more cameras in a stereo camera system to shift over time. If this happens then calibration will be lost.

This problem has not been recognized in the prior art because prior art stereo camera systems have either been laboratory type systems not subjected to shocks or vibrations or have been used in situations where highly accurate calibration has not been regarded as being critical. The inherent susceptibility of current stereo camera systems to losing calibration has therefore not been recognized as a particular problem.

Tocher, U.S. Pat. No. 5,483,336 discloses a stereoscopic optical rangefinder system. The system includes two arrays of photosensitive elements which each have associated focussing optics. A separate optical system corrects for relative motions of the arrays and the focussing optics which might be caused by mechanical shock or thermal vibrations. The Tocher system adds expense and complication. It is not clear whether the Tocher system can compensate for the effects of distorted lenses or rotations of light sensing arrays relative to one another.

There is a need for stereo camera systems having two or more cameras which can be used for extended periods in environments where they are exposed to vibration and or shock without losing calibration.

SUMMARY OF THE INVENTION

This invention provides a stereo camera system in which a rigid mounting member, which preferably comprises a metal plate, directly supports both a lens assembly and a light sensing assembly for each of two or more cameras. The mounting member holds the lens assemblies and light sensing assemblies rigidly relative to one another.

One aspect of the invention provides a stereo camera system comprising rigid mounting member having a front face and a rear face; a plurality of lens assemblies rigidly affixed to the mounting member, the lens assemblies each comprising a lens; and, a plurality of light sensing assemblies rigidly affixed to the mounting member. The mounting member is penetrated by a plurality of apertures which extend between the front and rear faces. The apertures provide paths for carrying light which is focussed by the lens assemblies onto the light sensing assemblies. Each of the lenses is located to focus light through one of the apertures onto one of the light sensing assemblies.

BRIEF DESCRIPTION OF DRAWINGS

In drawings which illustrate non-limiting embodiments of the invention:

FIG. 1 is a partially sectional view through a stereo camera system according to a first prior art design;

FIG. 2 is a sectional view through one camera in a stereo camera system according to a second prior art design;

Figure 3:
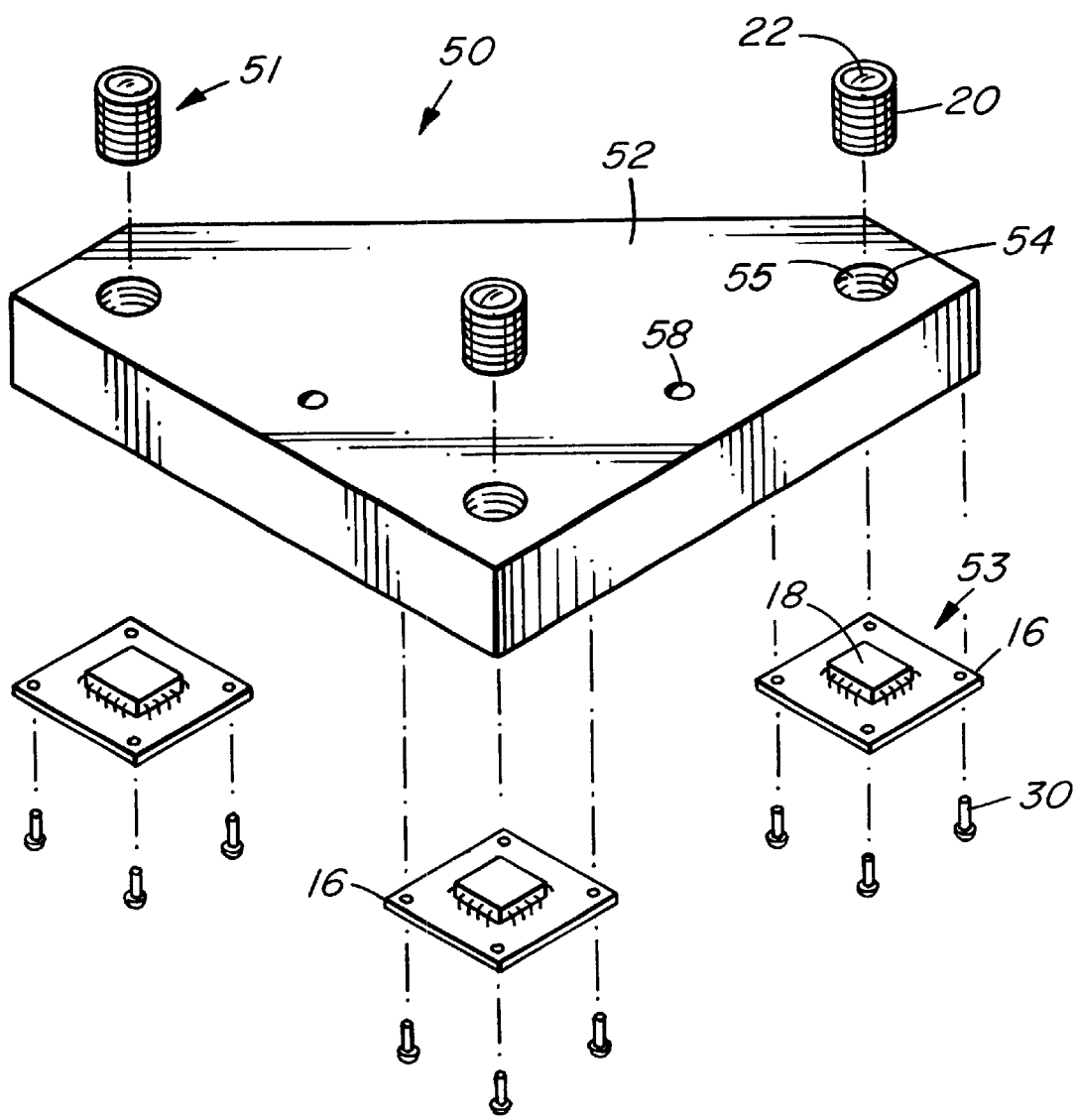
FIG. 3 is an exploded view of a stereo camera system according to a preferred embodiment of this invention.

LIST OF REFERENCE NUMERALS 10 stereo camera system
12, 12A base plate
14 camera
16, 16A circuit board
18 light sensor
19 set screw
20 lens housing
22 lens
24 lens holder
28 spacer
30 screw
32 aperture
50 stereo camera system 51 lens assembly
52 mounting member
53 light sensor assembly
54 aperture
55 threaded hole
56 front surface
57 cavity
58 pad
59 mounting hole

DETAILED DESCRIPTION

Prior Art

FIG. 1 shows a prior art stereo camera system 10. System 10 has a base 12 to which are mounted two or more electronic cameras 14. Each camera 14 comprises a circuit board 16 to which a light sensing array 16, which is typically a chip containing a CCD array, is mounted. A lens housing 20 contains one or more focussing lenses 22. Lens housings 20 are threadedly mounted in lens holders 24 so that the positions cf lenses 22 relative to light sensing arrays 18 can be adjusted to focus light onto the light sensing arrays 18. A set screw 19 is typically provided to lock the lens housing 20 in position after the lens has been focussed.

Lens holders 24 support lens housings 20 and also block light which does not pas, through lenses 22 from illuminating light sensing arrays 18. Each circuit board 16 is spaced away from base plate 12 by suitable spacers 28. Several suitable fasteners such as screws 30 hold circuit boards 16 in place on base 12. Cables (not shown for clarity) supply electrical power to and carry video signals from cameras 14 to a computer or other suitable processing system (not shown).

Cameras 14 are typically provided in the form of a separate module which is affixed to base 12 by screws 30. Such cameras are readily available from various suppliers of electronic equipment. As shown in FIG. 2, Many such cameras have a stack of two or more circuit boards in place of the single circuit board 16 shown in FIG. 1. Stereo camera systems made with cameras having multiple circuit boards are typically even more prone to falling out of calibration than the stereo camera system of FIG. 1.

It can be appreciated that the design of the system 10 shown in FIG. 1 permits slight movements of circuit board 16 from side to side relative to base 12 and also permits movements of lens holders 20 relative to light sensing arrays 18 and base 12. Further the base plates 12 typically used for supporting cameras in a stereo camera system are not completely rigid.

FIG. 2 shows a section through one camera in another type of prior art stereo camera system in which cameras 14 are mounted behind a base plate 12A. In FIG. 2, parts which are similar to the parts of FIG. 1 are given like reference numbers. The system 10A of FIG. 2 has cameras 14 mounted behind a base 12A. Each camera 14 is mounted adjacent an aperture 32 in base 12A with long screws 30 which extend through elongated spacers 34. The arrangement of system 10A of FIG. 2 provides even more opportunity for relative motion of cameras 14 and for shifts in the images received by cameras 14 than does the system of FIG. 1.

This Invention

The inventors have determined that the performance of a three-camera stereo camera system can become substantially degraded if any of the cameras moves by more than about ½ pixel relative to any of the other cameras. At currently available camera resolutions each camera should preferably not move relative to the other cameras by more than about 0.001 centimeters from the position it had when it was calibrated.

FIG. 3 shows a stereo camera system 50 according to the invention. System 50 has a rigid mounting member 52. A lens assembly 51 comprising a lens housing 20 and a light sensor assembly 53 for each of two or more cameras are each directly affixed to mounting member 52. Mounting member 52 both supports lens assemblies 51 relative to light sensing assemblies 53 and rigidly holds the components of each one of cameras 14 relative to the components of other ones of cameras 14.

Mounting member 52 is preferably fabricated from a unitary piece of material. Most preferably mounting member 52 is fabricated from a metal which has a coefficient of expansion which is less than about $1.3 \times 10^{-5}$ inches per degree Fahrenheit. Aluminum has been found to work well because it is reasonably low in density and can be readily machined. Mounting member 52 is most preferably in excess of 1.0 centimeters thick and is preferably in the range of 15 mm thick to about 25 mm thick. A satisfactory prototype has been made in which mounting member 52 is fabricated from 17 mm thick Aluminum plate. In addition to providing rigidity, this thickness permits mounting member 52 to completely replace the lens holders 24 which are used in conventional prior art stereo camera systems. If the material used for mounting member 52 is very stiff then portions of mounting member 52 may be reduced in thickness as long as mounting member 52 remains rigid enough to hold lenses 22 and light sensing arrays 18 in position to within the desired tolerance under the worst expected operational conditions.

Figure 4:
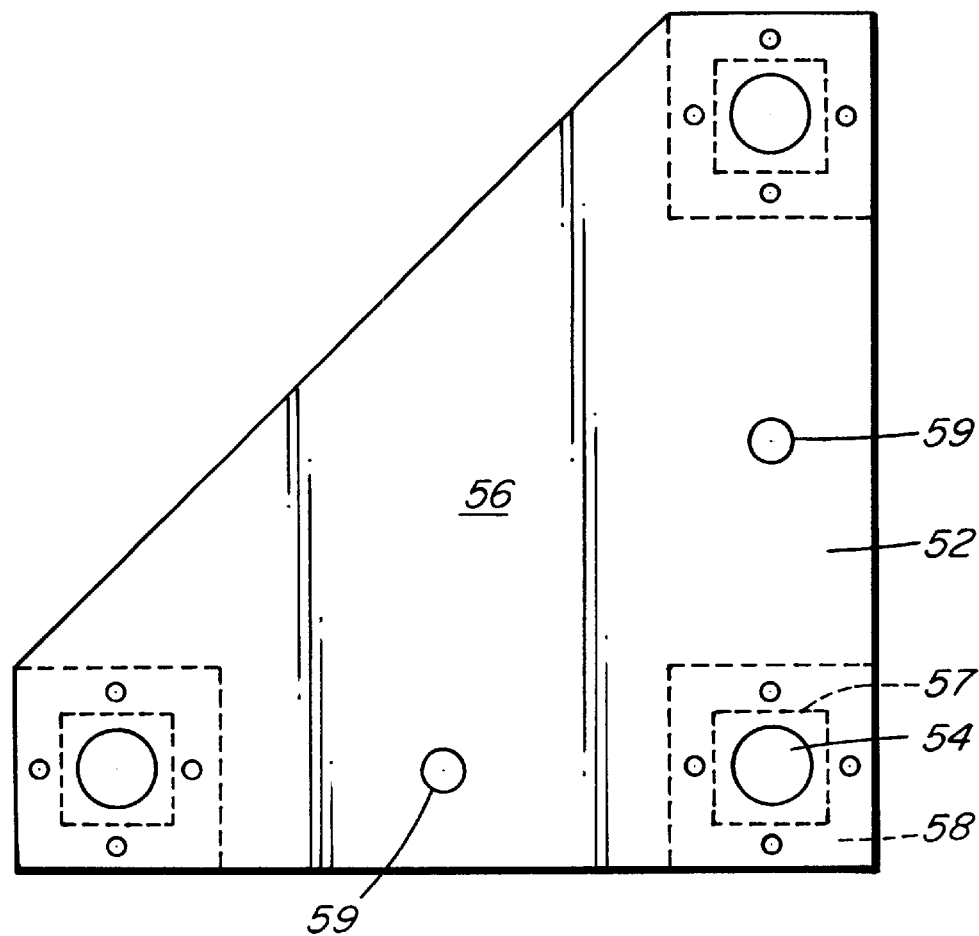
FIG. 4 is a front view of a mounting member of a stereo camera system according to the invention; and, FIG. 5 is a section through a stereo camera system according to a second embodiment of the invention in which several light sensing arrays are mounted on a single circuit board.

As shown in FIG. 4, mounting member 52 is penetrated by an aperture 54 at the location of each camera. Apertures 54 provide paths for light to pass through lenses 22 in lens assemblies 51 and on to light sensing arrays 18 in light sensing assemblies 53.

In the preferred embodiment illustrated in the drawings, each aperture 54 has a round threaded portion 55 extending to the front surface 56 of mounting member 52. Lens assemblies 53 each comprise a lens housing 20 which has a thread matching the thread of threaded portion 55 and is received within threaded portion 55. Lenses 22 in lens housings 20 (not shown in FIGS. 3 and 4) are preferably bedded in epoxy or otherwise immovably mounted within lens housings 20 as is known in the art.

Preferably threaded portions 55 are sufficiently deep to receive substantially the entire length of lens housings 20 and lenses 22 have focal lengths such that lens housings 20 are received substantially entirely within threaded portions 55 when lenses 22 are properly focussed. This supports lens housings 20 against torsional loads that could be caused if system 50 is dropped or otherwise jarred. Where mounting member 52 comprises a thick plate of rigid material, threaded portions 55 may be machined in holes bored in mounting member 52. Preferably the threads on both lens housings 20 and mounting member 52 are precisely machined so that lens 22 will remain stationary relative to mounting member 52 even if system 50 is jarred.

In the illustrated embodiment, each light sensing assembly 53 comprises a light sensing array 18 rigidly mounted to a circuit board 16. The light sensing array may be connected to circuit board 16 by way of leads from light sensing array 18 soldered to the circuit board 16.

Circuit boards 16, which carry light sensing arrays 18, are directly affixed to rigid mounting member 52. Cavities 57 at the rearward sides of apertures 54 communicate with threaded portions 55. Cavities 57 are dimensioned accommodate light sensing arrays 18. Preferably each circuit board 16 is affixed to mounting member 52 with three or more fasteners which are spaced apart around the periphery of a cavity 57. Most preferably the fasteners are screws received in threaded holes in mounting member 52. Preferably but optionally circuit boards 16 are also adhered to mounting member 52 with epoxy or another suitable adhesive.

Circuit boards 16 may be standard fiberglass circuit boards but should have a thickness sufficient to provide a degree of rigidity about the same as, or greater than, that of a fiberglass circuit board having a thickness of 0.082 inches.

After circuit boards 16 have been affixed to rigid mounting member 52 then lens housings 20 can be adjusted for focus. When proper focus has been achieved a locking material such as LOCTITE™ adhesive or an epoxy may be introduced between the threads of lens housings 20 and mounting member 52 to hold lens housings 20 in focus. The use of a locking material instead of a set screw to hold lens housings 20 in position permits lens housings 20 to be locked in place without disturbing the focus of lenses 22. When a set screw is used to hold a lens housing in position, as shown in FIG. 1, tightening the set screw can cause the lens housing to shift slightly in its lens holder. This can alter the lens focus.

Rigid mounting member 52 holds each of lens housings 20 precisely spaced from other ones of lens holders 20 and also maintains each light sensing array 18 held rigidly with respect to its lens housing 20. Threaded mounting holes 59 may be provided in rigid mounting member 52 to allow system 50 to be supported in a desired location.

Figure 5:
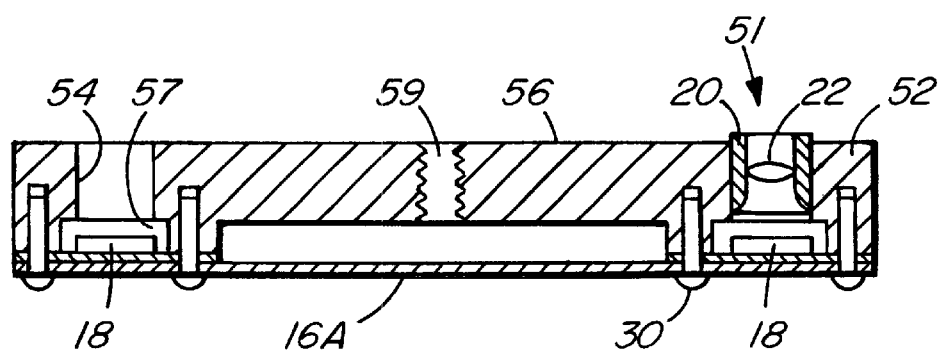

Instead of supplying a separate circuit board 16 for each camera 14, a single circuit board 16A to which two or more light sensor arrays 18 are affixed at spaced apart locations may be used. As shown in FIG. 5. Preferably circuit board 16A is secured with three or more screws 30 at spaced apart locations around the periphery of each cavity 57 so that there is no possibility that light sensing arrays 18 will move significantly relative to threaded apertures 54 in any direction. When a single circuit board is used, as shown in FIG. 5, mounting member 52 preferably has a pad 58 on its rear surface surrounding each cavity 57. Other portions of mounting member 52 are recessed so that they do not cause any short circuits in or mechanically interfere with components on circuit board 16A.

Each of the optical components of each camera in system 50 is rigidly affixed to the same mounting member 52. This provides a stereo camera system 50 which is much less susceptible to being disturbed by shock or vibration than are prior art stereo camera systems. Furthermore, where lens assemblies 51 are substantially received within mounting member 52, the lens assemblies are protected from side impact. System 50 does not require a case which is completely rigid because the case does not play a significant role in maintaining the relative positions of lens assemblies 51 and light sensing assemblies 53.

As will be apparent to those skilled in the art in the light of the foregoing disclosure, many alterations and modifications are possible in the practice of this invention without departing from the spirit or scope thereof. For example, while the foregoing description has described lens housings 20 as having threads which are received in threaded holes 54, lens housings 20 could be directly attached to mounting member 52 in another suitable manner. For example, lens housings could be provided with flanges (not shown) which are attached to the front face of mounting member 52 with screws or lens housings could be welded or rigidly adhesively affixed to mounting member 52. What is required is that mounting member 52 should be rigid and both a lens or lens housing and a light sensing array be directly attached to a rigid mounting member 52.

While mounting member 52 has been described as having threads formed in it to receive lens housings 20, the threads could be formed on threaded inserts which are rigidly affixed to mounting member 52 by a suitable process. For example, threaded inserts could be glued or welded into rigid member 52 or threaded inserts could be pressed into holes in rigid member 52. Conventional lens holders 24 could even be rigidly attached to a rigid member 52 to receive lens housings 20 and circuit boards 16.

Accordingly, the scope of the invention is to be construed in accordance with the substance defined by the following claims.

What is claimed is:

1. A stereo camera system comprising:
   (a) a rigid mounting member having a front face and a rear face, the mounting member penetrated by a plurality of apertures, the apertures extending between the front and rear faces;
   (b) a plurality of lens assemblies rigidly affixed to the mounting member, the lens assemblies each comprising a lens; and,
   (c) a plurality of light sensing assemblies rigidly affixed to the mounting member;
   wherein each of the lenses is located to focus light through one of the apertures onto one of the light sensing arrays.

2. The stereo camera system of claim 1 wherein the light sensing assemblies each comprise a light sensing array mounted on a circuit board.

3. The stereo camera system of claim 2 wherein the circuit board is rigidly affixed to the mounting member by a plurality of screws spaced apart around a periphery of each of the apertures.

4. The stereo camera system of claim 1 wherein the mounting member comprises an aluminum plate having a thickness in excess of 1.0 centimeters.

5. The stereo camera system of claim 1 wherein each of the apertures has a threaded portion on a forward side of the mounting member, each lens assembly comprises a lens rigidly affixed within a lens housing comprising a cylindrical threaded body and the lens housing is threadedly received in the threaded portion.

6. The stereo camera system of claim 5 wherein a rearward portion of each aperture comprises a cavity portion and a light sensing array is received within the cavity portion.

7. The stereo camera system of claim 5 wherein the threaded portion is dimensioned to receive substantially all of the lens housing and, when the lens is focussed on the light sensing array, the lens housing is substantially entirely received within the threaded portion.

8. The stereo camera system of claim 2 wherein each of the light sensing arrays is mounted to the same circuit board.

9. The stereo camera system of claim 7 wherein each of the apertures intersects a rear face of the mounting member within a face of a planar mounting pad.

10. The stereo camera system of claim 1 wherein each of the apertures intersects a rear face of the mounting member within a face of a planar mounting pad.

11. The stereo camera system of claim 1 wherein each of the lens assemblies comprises a cylindrical lens housing and one or more lenses located on an axis of the lens housing.

12. A stereo camera system comprising:
    a) a rigid mounting member having a front face and a rear face;
    b) a plurality of apertures penetrating the rigid mounting member, each of the apertures having a threaded portion adjacent the front face, the threaded portion dimensioned to receive a lens housing, and a cavity adjacent the rear face, the cavity dimensioned to receive a light sensing array;

c) a lens housing holding a focussing lens threadedly received in the threaded portion of each aperture; and, d) a light sensitive array supported in each cavity on a circuit board, the circuit board affixed to the rear face around a periphery of the cavity.

* * * * *